(12) United States Patent
Neiman

(10) Patent No.: US 8,014,666 B2
(45) Date of Patent: Sep. 6, 2011

(54) APPARATUS AND METHOD FOR REMOVABLY MOUNTING FILTERS TO A PHOTOGRAPHIC LENS

(76) Inventor: David Neiman, Minnetonka, MN (US)

( * ) Notice: Subject to any disclaimer, the term of this patent is extended or adjusted under 35 U.S.C. 154(b) by 0 days.

(21) Appl. No.: 12/689,097

(22) Filed: Jan. 18, 2010

(65) Prior Publication Data
US 2010/0183292 A1   Jul. 22, 2010

Related U.S. Application Data

(60) Provisional application No. 61/145,771, filed on Jan. 20, 2009.

(51) Int. Cl.
*G03B 17/00* (2006.01)
*G03B 7/00* (2006.01)
*H04N 5/225* (2006.01)
*G02B 5/20* (2006.01)

(52) U.S. Cl. ......... 396/533; 396/241; 348/342; 359/723

(58) Field of Classification Search ............. 396/533, 396/529–531, 241, 275; 348/342, 360; 359/722, 359/723
See application file for complete search history.

(56) References Cited

U.S. PATENT DOCUMENTS

| | | |
|---|---|---|
| 2,953,970 A | 9/1960 | Maynard |
| 3,896,463 A | 7/1975 | Laskey |
| 4,684,231 A | 8/1987 | Athy |
| 5,040,011 A | 8/1991 | Tiffen |
| 5,097,280 A | 3/1992 | Nomura |
| 5,208,624 A * | 5/1993 | MacKay ................ 396/544 |
| 5,528,328 A | 6/1996 | O'Farrill et al. |

* cited by examiner

*Primary Examiner* — Rochelle-Ann J Blackman
(74) *Attorney, Agent, or Firm* — Larkin Hoffman Daly & Lindgren Ltd.; Thomas J. Oppold

(57) ABSTRACT

A coupling system and method for removably mounting filters to a photographic camera lens. The coupling system includes a lens coupling element and filter coupling element. The lens coupling element has a magnetically attractive projecting ring that is telescopically received by and magnetically coupled within the annular body of the filter coupling element. The forward end of the annular body operably supporting a filter material.

17 Claims, 4 Drawing Sheets

APPARATUS AND METHOD FOR REMOVABLY MOUNTING FILTERS TO A PHOTOGRAPHIC LENS

BACKGROUND

The present invention is directed generally to photographic equipment and more particularly to the attachment of filters or other accessories to photographic lenses.

Presently, installing or removing a filter from a photographic lens requires the manual and tedious threading and unthreading of the filter from the lens each time a different filter is desired. This task is especially inconvenient during the performance or many photographic assignments, and particularly during weddings, sporting events, or when photographing wildlife. It is also difficult to perform this task with cold or gloved hands, while otherwise distracted, or when the threads of the filter, lens, or both have been damaged.

Hence, the ostensibly routine task of changing a filter often requires a frustrating and inordinate level of concentration to complete. Most photographers are familiar with the recurring difficulty and multiple false starts that attempting to attach filter to lens can entail. As a result, many photographers avoid changing filters unless absolutely necessary, and creative opportunities are thus frequently sacrificed to expediency.

The method of attaching filters to lenses remains perhaps the only feature of photographic equipment design to persist unmodified for several decades. A puzzling oversight, since most photographers appreciate the convenience of, for example, instant bayonet mounts for lens attachment, and quick-release adapters for mounting camera to tripod, both of which eliminate the use of threaded devices.

The standard method for attaching filters to lenses typically features a finely threaded female insert or threaded body along the inside front circumference of a lens barrel. These threads are present to provide a receptive fixture to accept and temporarily hold male-threaded filters or other accessories. Such threads are difficult to machine and prone to cross threading or other damage which renders them burdensome to use or ultimately, unusable. If necessary, re-machining of these threads is expensive and, depending on the value and type of lens, usually impractical. Similarly, photographic filters and other accessories require a correspondingly-threaded male body. Most commonly, filters are machined from aluminum and receive a black anodized finish. Regular installation and removal of the device causes deterioration of the fine anodized threads. This eventually results in the tendency of the filter to bind, particularly when installed into another aluminum fixture, with cross threading damage the usual result. Once damaged, it is not cost-effective to repair a filter, and depending on the extent of damage, may render the filter unusable.

Others have attempted to attach filters or accessories to lenses utilizing magnetic attraction. However all these prior attempts were offered as additive devices to modify or augment existing methods, and none presented a viable alternative to the current industry-standard method. All are characterized by either impractical utility of the design, or unacceptable size and bulk. Some incorporate multiple magnets, specifically polarized and oriented, adding weight and cost, introducing design and manufacturing complexity, and furthermore necessitating specifications to identify polarity and installation orientation of the magnets in order to insure proper functionality of the devices. Consequently, such prior attempts have not met with commercial success.

DESCRIPTION OF THE DRAWING FIGURES

DESCRIPTION

Figure 1:
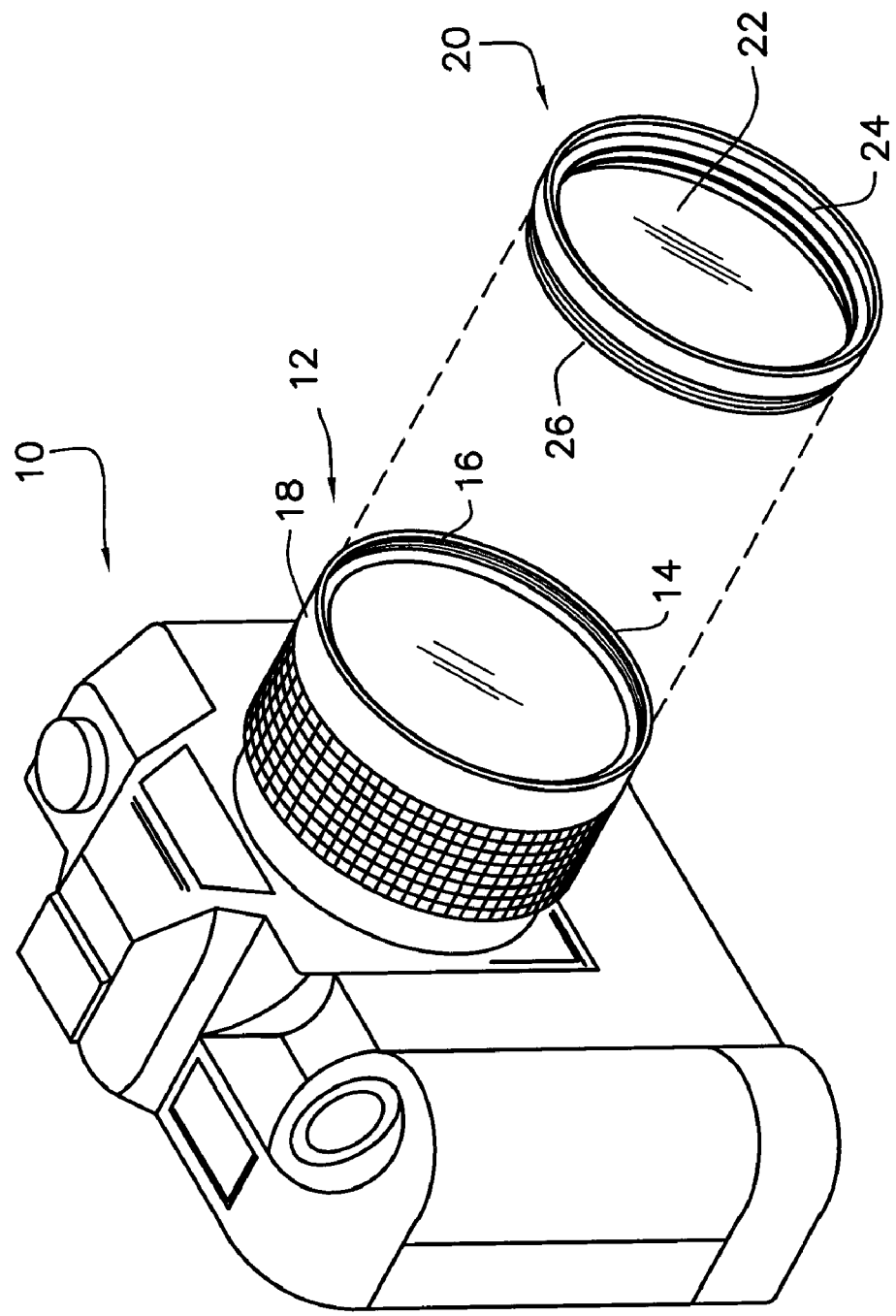
FIG. 1 is a perspective view of a typical, conventional camera having a lens, which may or may not be removable, and illustrating how a conventional, prior art filter threadably mounts to within the threaded recess of the lens.

Referring now to the drawings, wherein like reference numerals designate identical or corresponding parts throughout the several views, FIG. 1 is a perspective view of a typical conventional camera 10 (digital or film) with a lens 12. It should be understood that the camera 10 and lens 12 of FIG. 1 are intended to be representative of any camera with a removable or fixed photographic lens. The term "lens" or "lenses," as used herein, should be understood as meaning the element or component of a camera which allows for, and controls, the transmission of light to form an image on film or a digital light collection device. Lenses are typically manufactured in an array of fixed or varying focal lengths and mount to cameras via proprietary and non-standardized mounts such that they are generally not interchangeable between manufacturers.

While the lenses may be proprietary to the camera manufacturers, virtually all lenses include an industry standard and universally used and recognized threaded recess 14 at the front end 16 of the lens barrel 18. This threaded recess 14 is used to threadably receive a filter 20 or other accessory, allowing for interchangeability of accessories of any appropriately sized device on any lens produced by any manufacturer. The threaded recesses 14 are normally defined by size in millimeters, e.g., 62 mm, 77 mm, etc.

As used herein, the term "filter" or "filters" should be understood as meaning any optically translucent material which, when placed in front of the lens, alters the incoming light to achieve a desired modification of the resulting image. Filters are used almost universally by professional and amateur photographers alike. Good equipment maintenance practices dictate that a photographic filter be kept on a lens at all times to protect the delicate front element from damage. Typical filters remove UV radiation, alter image contrast, and balance or improve color rendition and saturation. Specialty filters may be used creatively to add diffusion, create patterns or introduce unusual color effects. A typical filter 20 is comprised of a desired filter material 22 mounted within a filter body 24 having an exterior threaded flange 26 sized to be threadably received within the threaded recess 14 of the lens 12. Filters 20 are produced in standard sizes corresponding to the lens configurations, thus allowing interchangeability between identically sized filters and accessories from any manufacturer on any lens.

Figure 2:
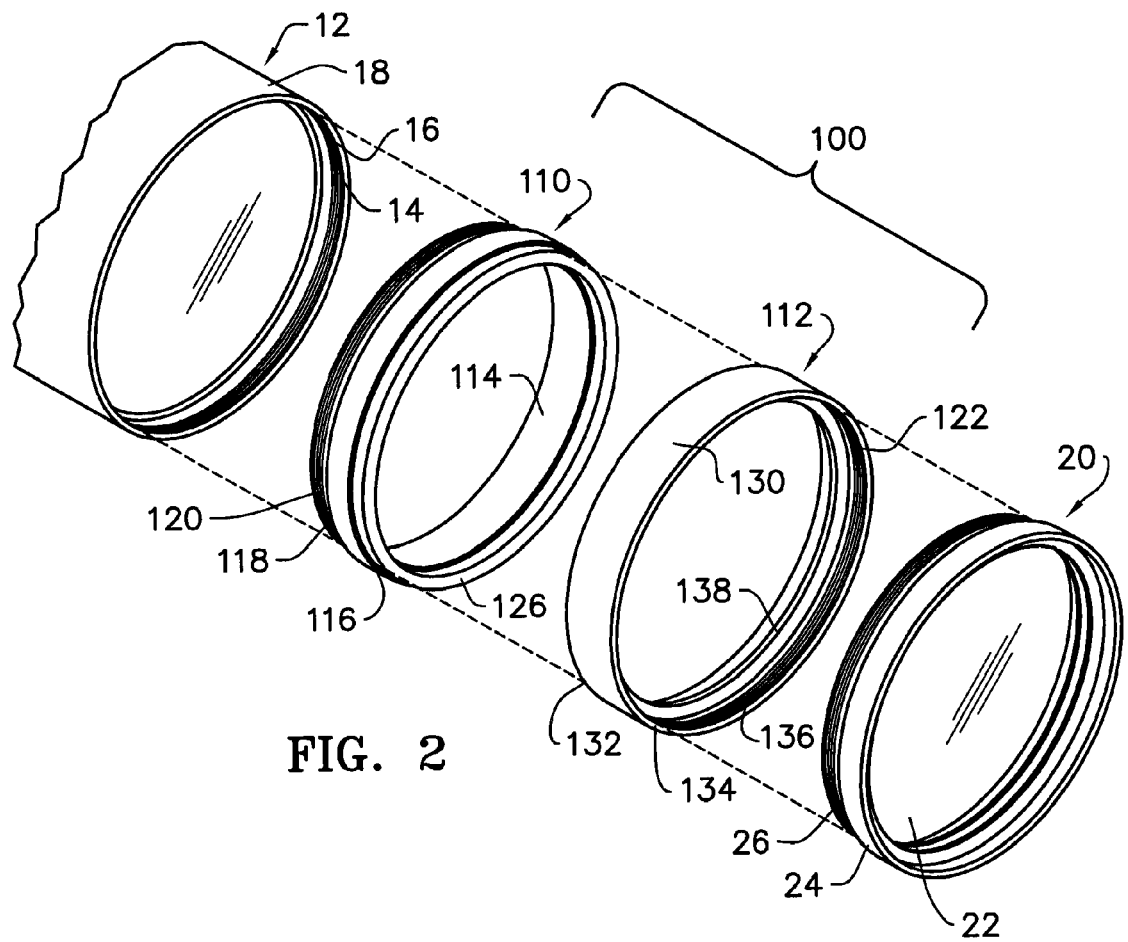
FIG. 2 is an exploded perspective view of one embodiment of a filter coupler system for removably mounting a filter to a photographic lens.
Figure 3:
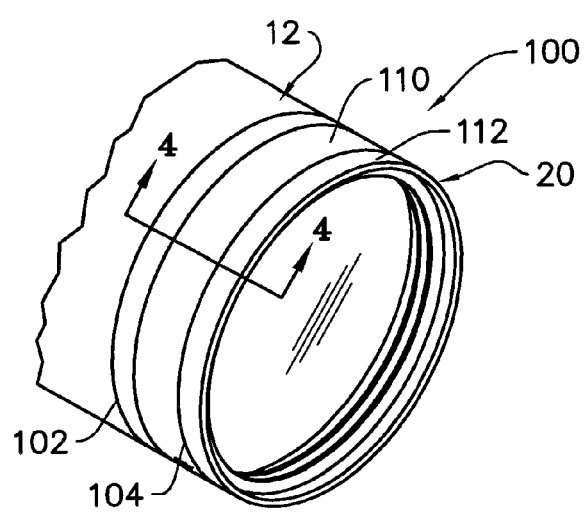
FIG. 3 is a perspective view of the filter coupler system of FIG. 2 shown assembled.
Figure 4:
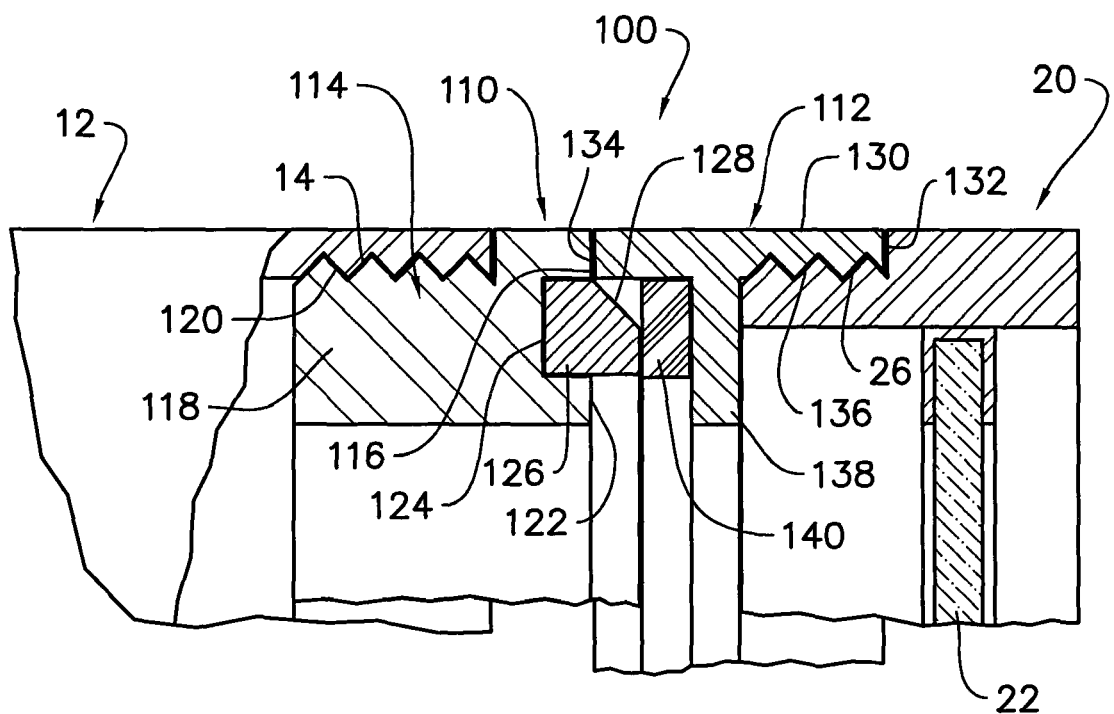
FIG. 4 is a partial cross-sectional view of the filter coupler system as viewed along lines 4-4 of FIG. 3.

Referring now to FIG. 2, an exploded perspective view of one embodiment of the filter coupler system 100 is illustrated. FIG. 3 is a perspective view of the filter coupler system of FIG. 2 shown assembled. As best illustrated in FIG. 3, the filter coupler system 100 has a rearward end 102 adjacent the camera lens 12 and a forward end 104 adjacent the conventional filter 20. FIG. 4 is an enlarged partial cross-sectional view as viewed along lines 4-4 of FIG. 3.

The filter coupler 100 preferably comprises two components; a lens coupling element 110 and a filter coupling element 112. The lens coupling element 110 preferably includes an annular body 114 having a forward end 116 and a rearwardly extending annular flange 118 having exterior threads 120 sized to be received within the female threaded recess 14 of the lens 12. The forward end 116 of the annular body 114 of the lens coupling element 110 preferably includes a front face 122 (FIG. 4) having an inside diameter that does not obstruct the lens 12. A channel 124 (FIG. 4) is preferably formed within the front face to receive an insert 126, preferably made of steel or other ferromagnetic or magnetically attractive material.

The insert 126 may be press fit and/or glued, bonded or otherwise fixed within the channel 124. In the preferred embodiment, the insert 126 projects a short distance beyond the front face 122 of the lens coupling element 110 and has an outside diameter slightly less than the inside diameter of the rearward end of the filter coupling element 112 (discussed later). Additionally, the outer circumferential edge of the insert 126 is preferably machined with a small chamfer 128 (FIG. 4), the purpose of which will be discussed later. The insert 126 may be chemically plated, coated or encapsulated, or otherwise manufactured to provide a cosmetically attractive and durable surface. The channel 124 and the insert 126 are preferably annular, but the channel 124 and insert 126 may comprise a series of segments spaced circumferentially around the front face 122.

The outer circumference of the lens coupling element 110 may include fins or other raised portions at regular intervals to differentiate the lens coupling element 110 from the lens 12 and other elements of the filter coupler assembly 100 so as to enable a user to more easily grip the lens coupling element for installation and removal.

Continuing to refer to FIGS. 2 and 4, the filter coupling element 112 preferably comprises an annular body 130 having a forward end 132 and a rearward end 134. The forward end preferably includes interior threads 136 to threadably receive the male exterior threaded flange 26 of a standard filter 20. When viewed in cross-section (FIG. 4), the annular body 130 of the filter coupling element 112 is preferably T-shaped with an inwardly projecting rib 138. The inside diameter of the rib 138 is preferably the same as the inside diameter of the front face 122 of the lens coupling element 110. A thin magnet 140 is preferably fixed to the rearward face of the rib 138 such that it is in coaxial alignment with the magnetically attractive insert 126 of the lens coupling element 110. The magnet 140 preferably has an outside diameter slightly less than the outside diameter of the rib 138, and an inside diameter that is the same as or slightly greater than the inside diameter of the rib 138, so as not to obstruct the lens 12 or interfere with the transmission of light. It should be appreciated that although the magnet 140 is preferably in the shape of a thin ring, the magnet 140 may also comprise a series of segments spaced circumferentially around the rearward face of the rib 138 positioned to magnetically attract the insert 126.

Referring to FIG. 4, it is preferred that the thickness of the magnet 140 and the axial position of the rib 138 within the annular body 130 to which it is affixed, is such that the magnet 140 comes in close or direct contact with the mounting surface of the projecting insert 126 forwardly of the rearward end of the filter coupling element 112, thereby providing a telescoping connection having lateral stability and which prevents inadvertent misalignment or movement of the coupler 100 while in use.

It is preferred that only the forwardly projecting insert 126 is magnetically attractive, and not any other part of the front face 122 or body 114 of the lens coupling element 110. This serves to isolate the attraction of the magnet 140 to the projecting insert 126 in order to affect proper seating of the filter coupling element 112 onto the lens coupling element 110 and prevent the undesirable misalignment that stray magnetic attraction might induce. Accordingly, the bodies 114, 130 of the lens coupling element 110 and the filter coupling element 112 are preferably fabricated from aluminum, plastic, or other suitably rigid, non-ferromagnetic material.

In practice, a single lens coupling element 110 may remain threadably mounted to the camera lens 12 as shown and, ideally, a plurality of filter coupling elements 112 will have already been threaded onto the various different filters 20 that the photographer may utilize. Thus, when the photographer desires to switch to a different filter 20, the photographer can simply pull on the filter coupling element 112 to remove it from the magnetically coupled lens coupling element 110. The photographer can then simply reach for a different desired filter 20 already having a filter coupling element 112 threadably attached thereto, thereby allowing the photographer to quickly substitute one filter 20 for another. The telescoping, self aligning connection between the two elements 110, 112 which is guided by the chamfered outer circumferential edge 128 and magnetic attraction between the two elements 110, 112 preferably provides the photographer with an audible "clap" and positive feel so he or she knows that the two elements 110, 112 are properly seated without necessarily having to double check the connection.

Figure 5:
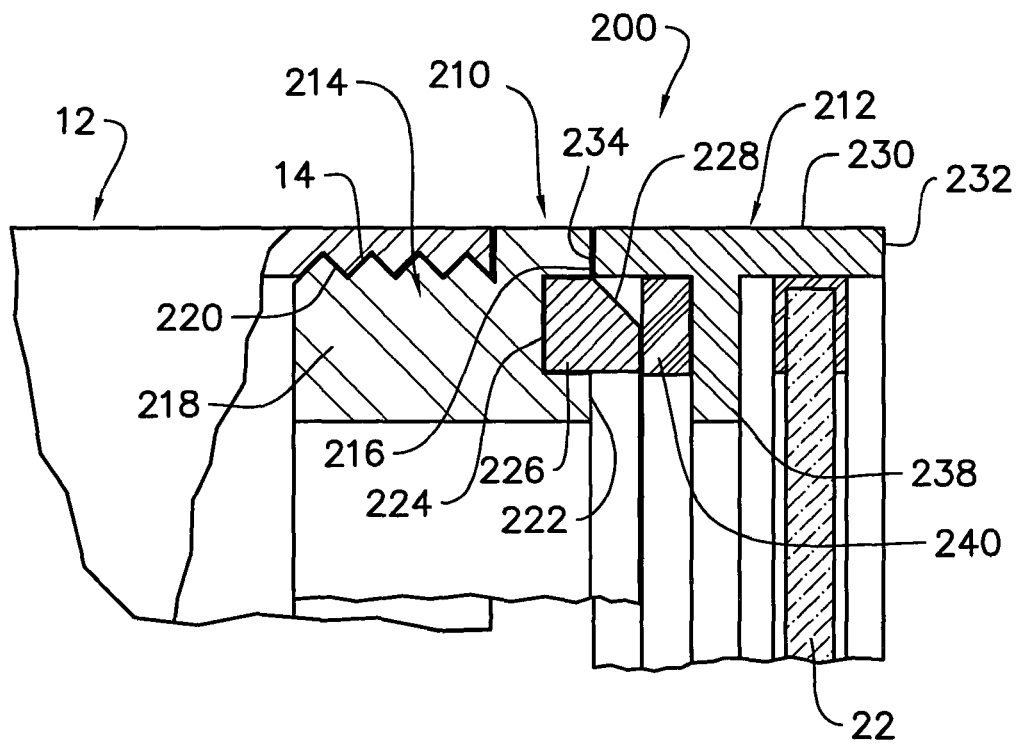
FIG. 5 is a partial cross-sectional view of an alternative embodiment of a filter coupler system for removably mounting a filter to a photographic lens.

FIG. 5 illustrates a second alternative embodiment of a filter coupler 200. As in the first embodiment, in this second embodiment, the filter coupler 200 also comprises a lens coupling element 210 magnetically coupled to a filter coupling element 212. The lens coupling element 210 is substantially identical to the lens coupling element 110 previously described in the first embodiment. The lens coupling element 210 preferably includes an annular body 214 having a forward end 216 and a rearwardly extending annular flange 218 having exterior threads 220 sized to be received within the female threaded recess 14 of the lens 12. The forward end 216 of the annular body 214 of the lens coupling element 210 preferably includes a front face 222 having an inside diameter that does not obstruct the lens 12. A channel 224 is preferably formed within the front face to receive an insert 226, preferably made of steel or other ferromagnetic or magnetically attractive material.

The insert 226 may be press fit and/or glued, bonded or otherwise fixed within the annular channel 224. As in the previous embodiment, the insert 226 projects a short distance beyond the front face 222 of the lens coupling element 210 and has an outside diameter slightly less than the inside diameter of the rearward end of the filter coupling element 212. As in the previous embodiment, the outer circumferential edge of the insert 226 is preferably machined with a small chamfer 228. The insert 226 may be chemically plated, coated or encapsulated, or otherwise manufactured to provide a cosmetically attractive and durable surface. The channel 224 and the insert 226 are preferably annular, but the channel 224 and insert 226 may comprise a series of segments spaced circumferentially around the front face 222.

The outer circumference of the lens coupling element 210 may include fins or other raised portions at regular intervals to differentiate the lens coupling element 210 from the lens 12 and other elements of the filter coupler assembly 200 so as to enable a user to more easily grip the lens coupling element for installation and removal.

The filter coupling element 212 preferably comprises an annular body 230 having a forward end 232 and a rearward end 234. However, unlike the previous embodiment, the forward end does not include interior threads to threadably receive the male exterior threaded flange 26 of a standard filter 20. Instead, as described later, in this second embodiment, the filter material 22 is disposed within the filter coupling element 212 thereby eliminating the need for a attaching a separate filter 20. As in the first embodiment, when viewed in cross-section, the annular body 230 of the filter coupling element 212 is preferably T-shaped with an inwardly projecting rib 238. The inside diameter of the rib 238 is preferably the same as the inside diameter of the front face 222 of the lens coupling element 210. A thin magnet 240 is preferably fixed to the rearward face of the rib 238 such that it is in coaxial alignment with the magnetically attractive insert 226 of the lens coupling element 210. The magnet 240 preferably has an outside diameter slightly less than the outside diameter of the rib 238 and an inside diameter that is the same as or slightly greater than the inside diameter of the rib 238 so as not to obstruct the lens 12 or interfere with the transmission of light. It should be appreciated that although the magnet 240 is preferably in the shape of a thin ring, the magnet 240 may also comprise a series of segments spaced circumferentially around the rearward face of the rib 238 positioned to magnetically attract the insert 226.

As illustrated in FIG. 5, it is preferred that the thickness of the magnet 240 and the axial position of the rib 238 within the annular body 230 to which it is affixed is such that the magnet 240 comes in close or direct contact with the mounting surface of the projecting insert 226 forwardly of the rearward end of the filter coupling element 212, thereby providing a telescoping connection having lateral stability and which prevents inadvertent misalignment or movement of the coupler 200 while in use.

As in the first embodiment, it is preferred that only the forwardly projecting insert 226 is magnetically attractive, and not any other part of the front face 222 or body 214 of the lens coupling element 210. This serves to isolate the attraction of the magnet 240 to the projecting insert 226 in order to affect proper seating of the filter coupling element 212 onto the lens coupling element 210 and prevent the undesirable misalignment that stray magnetic attraction might induce. Accordingly, the bodies 214, 230 of the lens coupling element 210 and the filter coupling element 212 are preferably fabricated from aluminum, plastic, or other suitably rigid, non-ferromagnetic material.

In practice, a single lens coupling element 210 may remain threadably mounted to the camera lens 12 as shown and, ideally, a plurality of filter coupling elements 212 are provided with various filter materials 22 disposed therein. Thus, when the photographer desires to switch to a different filter material for a different affect, the photographer can simply pull on the filter coupling element 212 to remove it from the magnetically coupled lens coupling element 210. The photographer can then simply reach for a different filter coupling element 210 with the desired filter material 22, thereby allowing the photographer to quickly substitute between filter materials. The telescoping, self aligning connection between the two elements 210, 212 which is guided by the chamfered outer circumferential edge 228 and magnetic attraction between the two elements 210, 212 preferably provides the photographer with an audible "clap" and positive feel so he or she knows that the two elements 210, 212 are properly seated without necessarily having to double check the connection.

Figure 6:
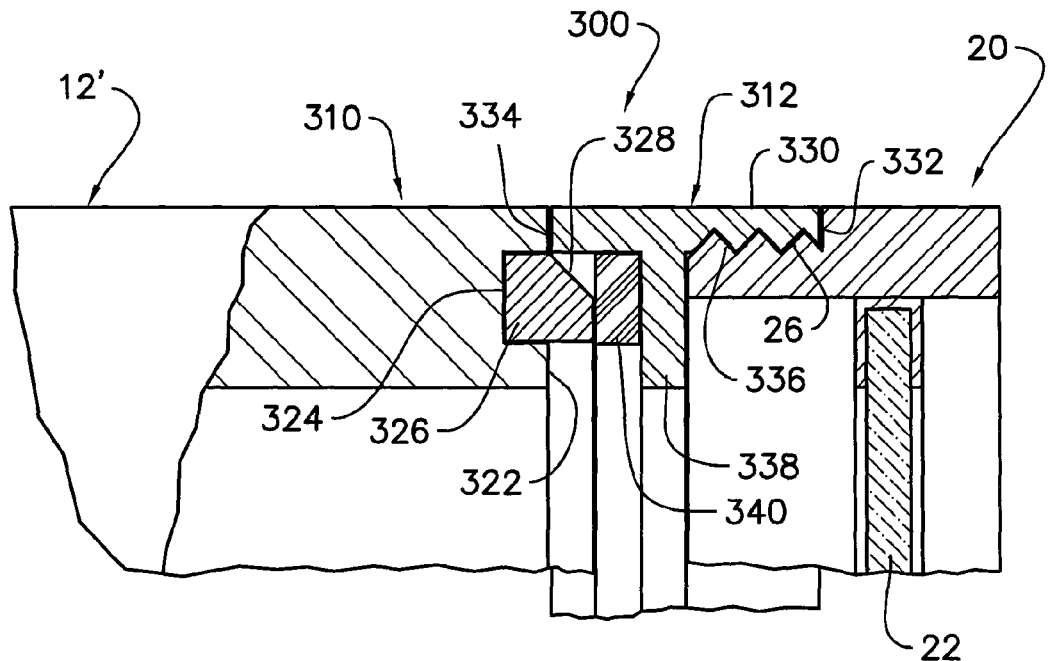
FIG. 6 is a partial cross-sectional view of another alternative embodiment of a filter coupler system for removably mounting a filter to a photographic lens.

FIG. 6 illustrates a third alternative embodiment of a filter coupler 300. As in the previous embodiments, in this third embodiment, the filter coupler 300 also comprises a lens coupling element 310 magnetically coupled to a filter coupling element 312. Unlike the first two embodiments, however, in the third embodiment, the lens coupling element 310 is affixed to, or is otherwise a part of, or is integral with the lens 12' produced by an original equipment manufacturer (OEM). In this embodiment, the lens 12' includes a front face 322 within which is a channel 324 that receives an insert 326, preferably made of steel or other ferromagnetic or magnetically attractive material.

The insert 326 may be press fit and/or glued, bonded or otherwise fixed within the channel 324. As in the previous embodiments, the insert 326 projects a short distance beyond the front face 322 of the lens and has an outside diameter slightly less than the inside diameter of the rearward end of the filter coupling element 312. As in the previous embodiments, the outer circumferential edge of the insert 326 is preferably machined with a small chamfer 328. The insert 326 may be chemically plated, coated or encapsulated, or otherwise manufactured to provide a cosmetically attractive and durable surface. The channel 324 and the insert 326 are preferably annular, but the channel 324 and insert 326 may comprise a series of segments spaced circumferentially around the front face 322.

The filter coupling element 312 preferably comprises an annular body 330 having a forward end 332 and a rearward end 334. The forward end preferably includes interior threads 336 to threadably receive the male exterior threaded flange 26 of a standard filter 20. When viewed in cross-section, the annular body 330 of the filter coupling element 312 is preferably T-shaped with an inwardly projecting rib 338. The inside diameter of the rib 338 is preferably the same as the inside diameter of the front face 322 of the lens coupling element 310. A thin magnet 340 is preferably fixed to the rearward face of the rib 338 such that it is in coaxial alignment with the magnetically attractive insert 326 of the lens coupling element 310. The magnet 340 preferably has an outside diameter slightly less than the outside diameter of the rib 338 and an inside diameter that is the same as or slightly greater than the inside diameter of the rib 338 so as not to obstruct the lens 12' or interfere with the transmission of light. It should be appreciated that although the magnet 340 is preferably in the shape of a thin ring, the magnet 340 may also comprise a series of segments spaced circumferentially around the rearward face of the rib 338 positioned to magnetically attract the insert 326.

As illustrated in FIG. 6, it is preferred that the thickness of the magnet 340 and the axial position of the rib 338 within the annular body 330 to which it is affixed is such that the magnet 340 comes in close or direct contact with the mounting surface of the projecting insert 326 forwardly of the rearward end of the filter coupling element 312, thereby providing a telescoping connection having lateral stability and which prevents inadvertent misalignment or movement of the coupler 300 while in use.

It is preferred that only the forwardly projecting insert 326 is magnetically attractive, and not any other part of the front face 322 or lens 12'. This serves to isolate the attraction of the magnet 340 to the projecting insert 326 in order to affect proper seating of the filter coupling element 312 onto the lens coupling element 310 and prevent the undesirable misalignment that stray magnetic attraction might induce. Accordingly, the lens 12' and the filter coupling element 312 are preferably fabricated from aluminum, plastic, or other suitably rigid, non-ferromagnetic material.

In practice, a single lens coupling element 310 remains fixed to the camera lens 12' as shown and, ideally, a plurality of filter coupling elements 312 will have already been threaded onto the various different conventional filters 20 that the photographer may utilize. Thus, when the photographer desires to switch to a different filter 20, the photographer can simply pull on the filter coupling element 312 to remove it from the magnetically coupled lens coupling element 310. The photographer can then simply reach for a different desired filter 20 already having a filter coupling element 312 threadably attached thereto, thereby allowing the photographer to quickly substitute one filter 20 for another. The telescoping, self aligning connection between the two elements 310, 312 which is guided by the chamfered outer circumferential edge 328 and magnetic attraction between the two elements 310, 312 preferably provides the photographer with an audible "clap" and positive feel so he or she knows that the two elements 310, 312 are properly seated without necessarily having to double check the connection.

Figure 7:
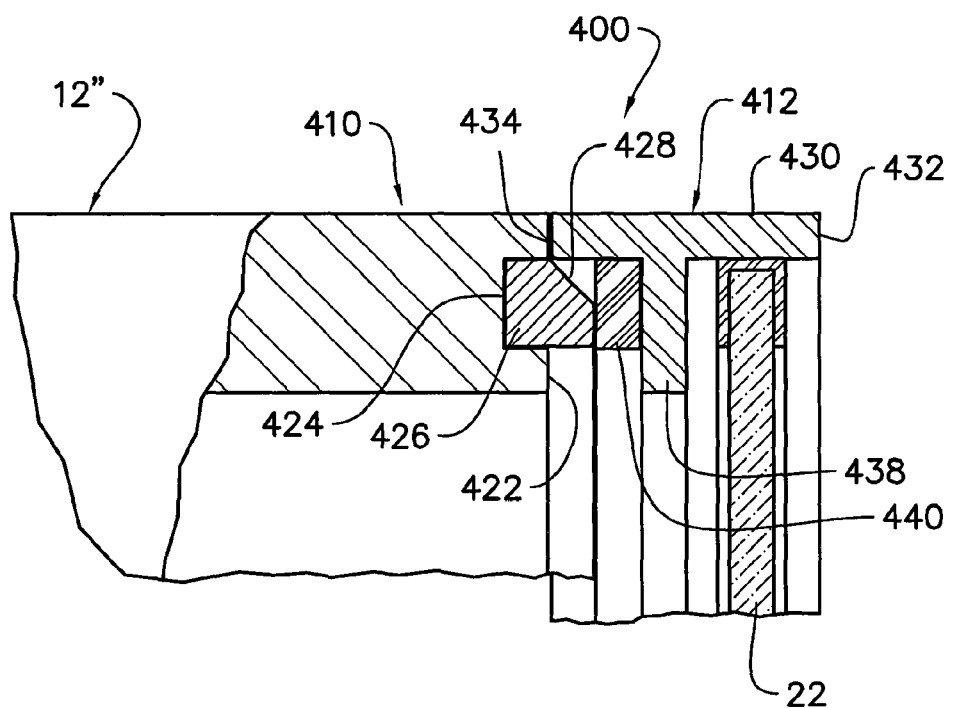
FIG. 7 is a partial cross-sectional view of another alternative embodiment of a filter coupler system for removably mounting a filter to a photographic lens.

FIG. 7 illustrates a fourth alternative embodiment of a filter coupler 400. As in the previous embodiments, in this fourth embodiment, the filter coupler 400 also comprises a lens coupling element 410 magnetically coupled to a filter coupling element 412. Like the third embodiment, in this fourth embodiment, the lens coupling element 410 is affixed to, or is otherwise a part of, or is integral with the lens 12" produced by an original equipment manufacturer (OEM). In this embodiment, the lens 12" includes a front face 422 within which is a channel 424 that receives an insert 426, preferably made of steel or other ferromagnetic or magnetically attractive material.

The insert 426 may be press fit and/or glued, bonded or otherwise fixed within the channel 424. As in the previous embodiments, the insert 426 projects a short distance beyond the front face 422 of the lens and has an outside diameter slightly less than the inside diameter of the rearward end of the filter coupling element 412. As in the previous embodiment, the outer circumferential edge of the insert 426 is preferably machined with a small chamfer 428. The insert 426 may be chemically plated, coated or encapsulated, or otherwise manufactured to provide a cosmetically attractive and durable surface. The channel 424 and the insert 426 are preferably annular, but the channel 424 and insert 426 may comprise a series of segments spaced circumferentially around the front face 422.

The filter coupling element 412 preferably comprises an annular body 430 having a forward end 432 and a rearward end 434. As in the second embodiment, the forward end does not include interior threads to threadably receive the male exterior threaded flange 26 of a standard filter 20. Instead, in this fourth embodiment, the filter material 22 is disposed within the filter coupling element 412 thereby eliminating the need for a attaching a separate filter coupling element 20. As in the previous embodiments, when viewed in cross-section, the annular body 430 of the filter coupling element 412 is preferably T-shaped with an inwardly projecting rib 438. The inside diameter of the rib 438 is preferably the same as the inside diameter of the front face 422 of the lens coupling element 410. A thin magnet 440 is preferably fixed to the rearward face of the rib 438 such that it is in coaxial alignment with the magnetically attractive insert 426 of the lens coupling element 410. The magnet 440 preferably has an outside diameter slightly less than the outside diameter of the rib 438 and an inside diameter that is the same as or slightly greater than the inside diameter of the rib 438 so as not to obstruct the lens 12" or interfere with the transmission of light. It should be appreciated that although the magnet 440 is preferably in the shape of a thin ring, the magnet 440 may also comprise a series of segments spaced circumferentially around the rearward face of the rib 438 positioned to magnetically attract the insert 426.

As illustrated in FIG. 7, it is preferred that the thickness of the magnet 440 and the axial position of the rib 438 within the annular body 430 to which it is affixed is such that the magnet 440 comes in close or direct contact with the mounting surface of the projecting insert 426 forwardly of the rearward end of the filter coupling element 412, thereby providing a telescoping connection having lateral stability and which prevents inadvertent misalignment or movement of the coupler 400 while in use.

As in the previous embodiments, it is preferred that only the forwardly projecting insert 426 is magnetically attractive, and not any other part of the front face 422 or lens 12". This serves to isolate the attraction of the magnet 440 to the projecting insert 426 in order to affect proper seating of the filter coupling element 412 onto the lens coupling element 410 and prevent the undesirable misalignment that stray magnetic attraction might induce. Accordingly, the lens 12" and the filter coupling element 412 are preferably fabricated from aluminum, plastic, or other suitably rigid, non-ferromagnetic material.

In practice, a single lens coupling element 410 remains fixed to the camera lens 12" as shown and, ideally, a plurality of filter coupling elements 412 are provided with various filter materials 22 disposed therein. Thus, when the photographer desires to switch to a different filter material for a different affect, the photographer can simply pull on the filter coupling element 412 to remove it from the magnetically coupled lens coupling element 410. The photographer can then simply reach for a different filter coupling element with the desired filter material 22, thereby allowing the photographer to quickly substitute between filter materials. The telescoping, self aligning connection between the two elements 410, 412 which is guided by the chamfered outer circumferential edge 428 and magnetic attraction between the two elements 410, 412 preferably provides the photographer with an audible "clap" and positive feel so he or she knows that the two elements 410, 412 are properly seated without necessarily having to double check the connection.

In each of the embodiments, the magnet may be produced from any appropriate permanently magnetizable material which provides proper functionality, reliability, and durability, and of which can be fabricated to the necessary form and desired tolerances. The polarization of the magnet may be either through the thickness or across the diameter, whichever is easiest and most cost-effective to produce. The polarity does not need to be known or indicated when the magnet is installed. The magnetic attraction provided by the magnet should be sufficient such that when the filter coupling element 112, 212, 312, 412 is placed in proximity to the insert 126, 226, 326, 426 of the lens coupling element 110, 210, 310, 410, the magnetic attraction pulls the filter coupling element into place and an instantaneous alignment and seating occurs, securely attaching the filter coupling element to the lens coupling element. The magnet preferably has sufficient holding power to support the entire weight of the camera, yet preferably requires only moderate finger strength sufficient to overcome the magnetic attraction to remove the filter coupling element from the lens coupling element. The magnet may be chemically or otherwise coated to produce a cosmetically attractive finish and add durability.

In all embodiments, the focused area of attraction provided by the narrow mounting surface of the insert 126, 226, 326, 426 and magnetic 140, 240, 340, 440 enables the filter coupling element 112, 212, 312, 412 to effortlessly seat itself properly, firmly and repeatedly to the lens coupling element 110, 210, 310, 410 without the necessity of adjustments, regardless of the orientation or angle with which it is offered for attachment. In each of the embodiments, when the two elements properly come together, a distinctive clapping sound confirms that the filter coupling element is positively seated on the lens coupling element.

The foregoing description is presented to enable one of ordinary skill in the art to make and use the invention and is provided in the context of a patent application and its requirements. Various modifications to the preferred embodiment of the apparatus, and the general principles and features of the system and methods described herein will be readily apparent to those of skill in the art. Thus, the present invention is not to be limited to the embodiments of the apparatus, system and methods described above and illustrated in the drawing figures, but is to be accorded the widest scope consistent with the spirit and scope of the appended claims.

The invention claimed is:

1. A coupling system for removably mounting filters to a photographic lens, comprising:
    a lens coupling element having a front face disposed forwardly of a lens within a camera lens barrel, said lens coupling element further having a projection that is attractive to magnets but which itself is not a magnet, extending forwardly of said front face and having an outside diameter less than an outside diameter of said camera lens barrel;
    a filter coupling element having an annular body with a rearward end and a forward end, said rearward end sized to telescopically receive said projection and having a magnet recessed a distance within said annular body to magnetically couple with said telescopically received projection, said forward end of said annular body operably supporting a filter material.

2. The coupling system of claim 1 wherein said lens coupling element includes an annular lens coupling body having a rearwardly projecting flange with external threads sized to be threadably received within a threaded recess of said camera lens barrel.

3. The coupling system of claim 1 wherein said lens coupling element is integral with said camera lens barrel.

4. The coupling system of claim 1 wherein said forward end of said filter annular body includes a forwardly projecting flange with internal threads sized to threadably receive an externally threaded flange of a filter body within which the filter material is disposed.

5. The coupling system of claim 1 wherein said forward end of said filter annular body includes a filter material.

6. The coupling system of claim 3 wherein said forward end of said filter annular body includes a forwardly projecting flange with internal threads sized to threadably receive an externally threaded flange of a filter body within which the filter material is disposed.

7. The coupling system of claim 3 wherein said forward end of said filter annular body includes a filter material.

8. The coupling system of claim 1 wherein said magnetic attractive projection includes a sloped outer peripheral surface to assist in telescopically aligning said filter coupling element with said lens coupling element.

9. For a camera having a lens barrel with a forward threaded recess for threadably receiving lens filters, a removable filter coupling system, comprising:
    a lens coupling element having a rearwardly projecting flange with external threads sized to be threadably received within the threaded recess of the lens barrel, said lens coupling element further having a projection that is attractive to magnets but which itself is not a magnet, that extends forwardly and has an outside diameter less than an outside diameter of the lens barrel;
    a filter coupling element having an annular body with a rearward end and a forward end, said rearward end sized to telescopically receive said projection and having a magnet recessed a distance within said annular body to magnetically couple with said telescopically received projection, said forward end of said annular body operably supporting a filter material.

10. The coupling system of claim 9 wherein said forward end of said filter annular body includes a forwardly projecting flange with internal threads sized to threadably receive an externally threaded flange of a filter body within which the filter material is disposed.

11. The coupling system of claim 9 wherein said forward end of said filter annular body includes a filter material.

12. The coupling system of claim 9 wherein said magnetically attractive projection includes a sloped outer peripheral surface to assist in telescopically aligning said filter coupling element with said lens coupling element.

13. A method of preparing a camera a lens barrel with a forward threaded recess for threadably receiving lens filters to interchangeably magnetically receive a plurality of different lens filters, said method comprising:
    providing a lens coupling element having a rearwardly projecting flange with external threads, said lens coupling element further having a projection that is attractive to magnets but which itself is not a magnet, that extends forwardly and has an outside diameter less than an outside diameter of the lens barrel;
    threading said rearwardly projecting flange of said lens coupling element into the threaded recess of the lens barrel;
    providing a first filter coupling element having a first annular body with a rearward end and a forward end, said rearward end sized to telescopically receive said projection of said lens coupling element and having a magnet recessed a distance within said annular body, said forward end of said first annular body operably supporting a first filter material;
    magnetically coupling said first filter coupling element onto said lens coupling element with said projection of said lens coupling element telescopically received within said rearward end of said annular body of said first filter coupling element.

14. The method of claim 13 further comprising:
    providing a second filter coupling element having a second annular body with a rearward end and a forward end, said rearward end sized to telescopically receive said projection of said lens coupling element and having a magnet recessed a distance within said annular body, said forward end of said second annular body operably supporting a second filter material different from said first filter material;
    removing said first magnetically coupled first filter coupling element from said lens coupling element;

magnetically coupling said second filter coupling element onto said lens coupling element with said projection of said lens coupling element telescopically received within said rearward end of said annular body of said second filter coupling element.

15. The method of claim 13 wherein said forward end of said first filter annular body includes a forwardly projecting flange with internal threads sized to threadably receive an externally threaded flange of a filter body within which the first filter material is disposed.

16. The method of claim 14 wherein said forward end of said second filter annular body includes a forwardly projecting flange with internal threads sized to threadably receive an externally threaded flange of a filter body within which the second filter material is disposed.

17. The method of claim 14 wherein said magnetically attractive projection includes a sloped outer peripheral surface to assist in telescopically aligning said first and said second filter coupling elements with said lens coupling element.

* * * * *